United States Patent [19]
Burson

[11] 4,033,311
[45] July 5, 1977

[54] IGNITION SYSTEM WITH HAZARDOUS-START INHIBITING INTERLOCK

[75] Inventor: Bob O. Burson, East Longmeadow, Mass.

[73] Assignee: R. E. Phelon Company, Inc., East Longmeadow, Mass.

[22] Filed: Dec. 26, 1974

[21] Appl. No.: 536,597

[52] U.S. Cl. .................. 123/179 K; 123/198 D; 180/103 R
[51] Int. Cl.² .................................. F02N 17/00
[58] Field of Search .............. 123/179 K, 198 D; 180/103 R

[56] References Cited
UNITED STATES PATENTS

| | | | |
|---|---|---|---|
| 3,521,612 | 7/1970 | Santi et al. | 123/179 K |
| 3,574,288 | 4/1971 | Barth et al. | 123/179 K |
| 3,608,285 | 9/1971 | Berk | 180/103 R |
| 3,715,004 | 2/1973 | Pasek et al. | 123/179 K |
| 3,715,005 | 2/1973 | Byram et al. | 123/179 K |
| 3,718,128 | 2/1973 | Botker | 123/179 K |
| 3,726,265 | 4/1973 | Howard | 123/179 K |
| 3,783,216 | 1/1974 | Planer et al. | 180/82 R |
| 3,789,938 | 2/1974 | Hetteen | 180/103 R |
| 3,914,735 | 10/1975 | Guillaume | 180/103 R |

Primary Examiner—Carroll B. Dority, Jr.
Assistant Examiner—Paul Devinsky
Attorney, Agent, or Firm—McCormick, Paulding & Huber

[57] ABSTRACT

An ignition system of an internal combustion engine is provided with a hazardous-start inhibiting interlock that prevents the engine from being started unless an associated engine clutch, transmission, brake or similar device is placed in a safe condition for starting. The ignition system has a spark plug, a secondary winding of an ignition transformer connected to the plug to provide a sparking potential and a source of low-tension current pulses supplied to the primary winding of the ignition transformer in timed relationship with the engine cycle. The hazaradous-start inhibiting interlock is connected between the pulse source and the primary winding of the ignition transformer, and at the time of engine starting the interlock blocks the flow of current pulses to the primary winding unless the clutch, transmission or other device is safely positioned so that the vehicle or other mechanisms powered by the engine cannot be set in motion. The inhibiting interlock comprises one or more serially connected safety switches which are closed to transmit pulses from the source only when the clutch, transmission or other device is in its safe condition. If any one of these safety switches is open, engine starting is inhibited. A silicon controlled rectifier (SCR) is connected in parallel with the safety switches to maintain the transmission of pulses after the engine powered device is placed in operation and the safety switches are open. The SCR is made responsive to current pulses transmitted through the primary winding of the ignition transformer and is held in its conductive state after starting by an RC circuit having a capacitor that is charged by the current pulses. When the engine is shut off, the capacitor discharges and the SCR returns to its non-conductive state inhibiting another engine start until the safety switches are again closed by placing the associated clutch or other device in a safe starting condition.

10 Claims, 4 Drawing Figures

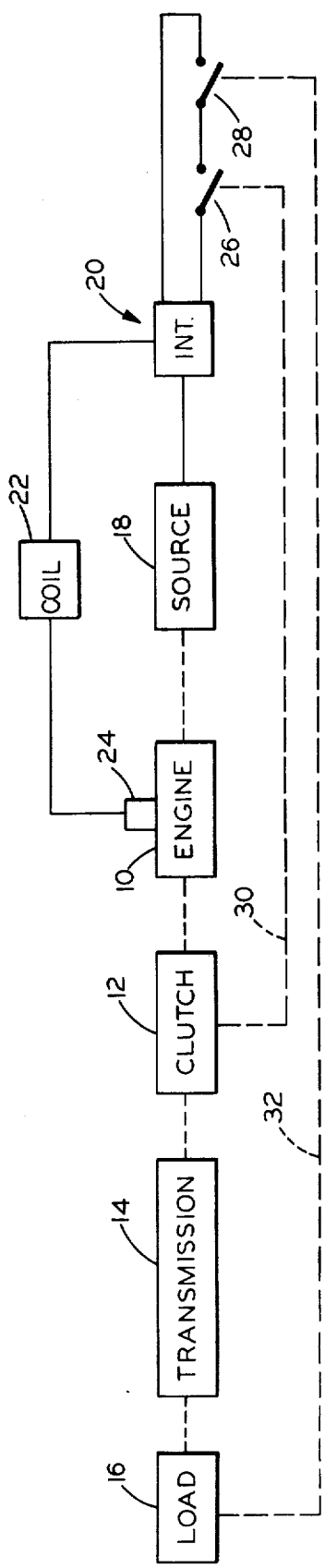
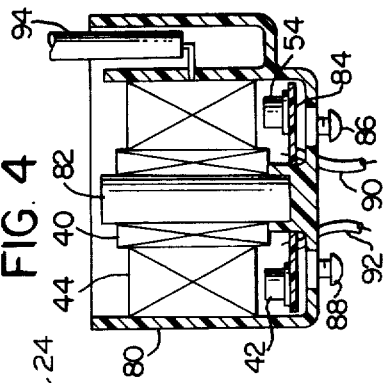
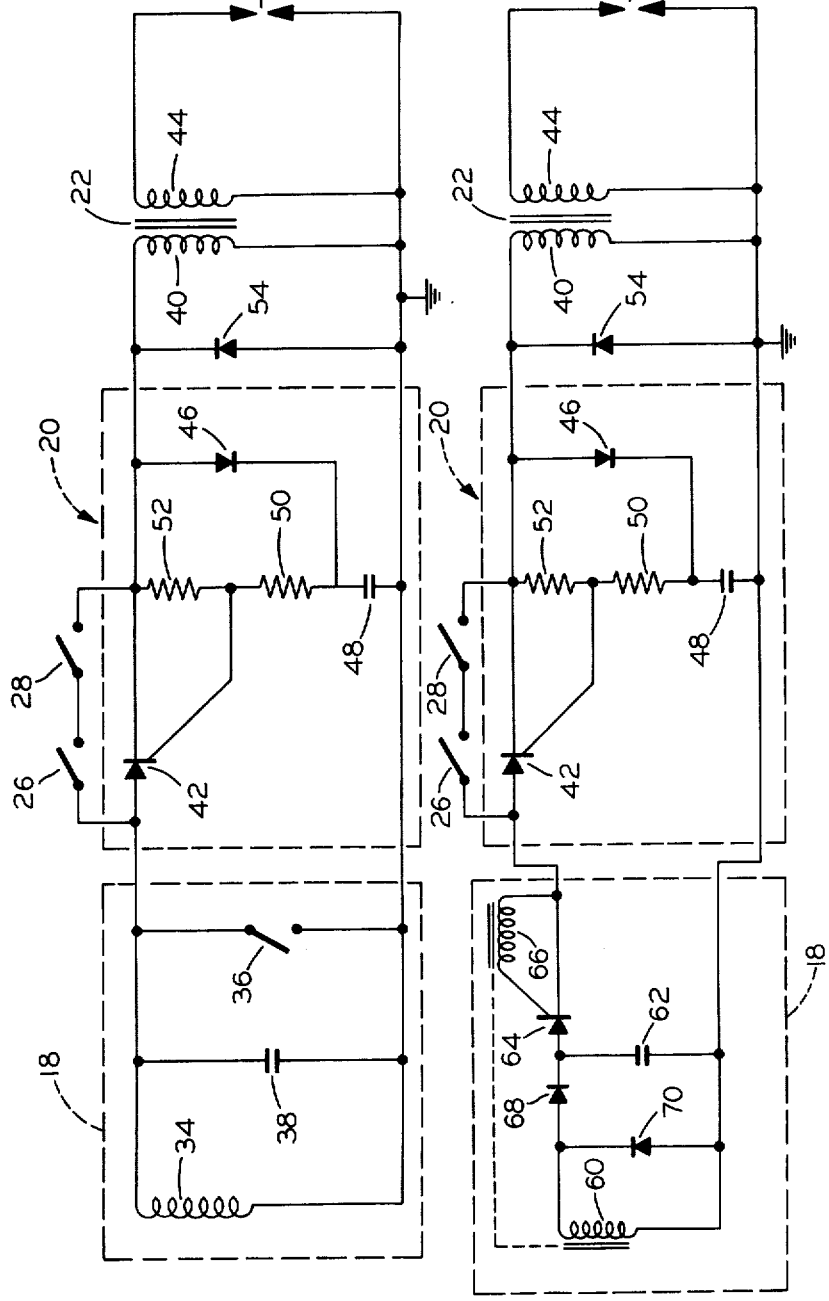
FIG. 1
FIG. 2
FIG. 3
FIG. 4

IGNITION SYSTEM WITH HAZARDOUS-START INHIBITING INTERLOCK

BACKGROUND OF THE INVENTION

The present invention relates to an engine ignition system having interlocking apparatus for preventing the starting of the engine when such starting would be hazardous to the individual operating the engine.

Ignition systems with interlocks that prevent engine starting are not new in the art. Such interlocks are frequently used to prevent an individual from inadvertently injuring himself or someone else by placing the engine and associated equipment in operation. For example, small garden tractors have transmissions, clutches and attachments which may be left engaged when the engine is shut off. If the engine is started while the transmission, clutch or attachment is engaged, the tractor or its attachments could cause severe injury to the individual who starts the engine or someone standing nearby.

Any number of unsafe conditions may be monitored and used to control an ignition interlock. For example, a number of serially connected safety switches may be required to be closed before the interlock enables the ignition system. Each switch of the series may be associated with a given control member or other element which has an associated safe and unsafe starting condition. A clutch pedal may be required to be depressed, a transmission lever to be depressed, a transmission lever to be in neutral, a parking brake to be set, a seat belt to be fastened and a guard shield to be in place before the ignition system in enabled.

U.S. Pat. No. 3,726,265 issued to William A. Howard, discloses an ignition interlock of this type. The interlock prevents starting in the presence of an unsafe or hazardous condition by shorting out the magneto primary coil of a magneto system with an SCR in a conductive state. The safety switches must be in a closed position when the engine is started in order to render the SCR non-conductive and, hence, non-shorting. The SCR is held in a non-conductive state after the engine has been started and a safety switch is opened by a memory circuit which detects the pulses produced by the magneto primary coil. When the engine is shut off, the memory circuit in the absence of pulses allows the SCR to return to its conductive state inhibiting starting until the safety switches are again closed.

Since the ignition interlock is fundamentally a safety device, it should be fail-safe, that is, if any portion of the interlock is broken or fails to operate, engine starting should be inhibited. For example, if either side of the safety switch is grounded or if any wires in the interlock break, engine starting should not be possible. Also, an interlock is more economical to manufacture if it contains fewer electronic components. The adaptability of the interlock to systems other than a magneto system such as a CD ignition system is also desirable. In these respects, the present invention constitutes an improvement over that described in the above-identified patent.

Other advantages provided by the ignition system of the present invention include its adaptability to single or multi-cylinder engines, the ability to enclose the ignition transformer and interlock components in a single potted module, and the fact that the interlock requires no moving parts or engine modifications for use in an internal combustion engine.

Accordingly, it is a general object of the present invention to provide an ignition system with a safety interlock that constitutes an improvement over the prior art.

SUMMARY OF THE INVENTION

The present invention resides in an ignition system for an internal combustion engine associated with at least one device such as a clutch, transmission brake or safety device that is moveable between a safe and unsafe condition for engine starting. The ignition system comprises a conventional spark plug and ignition transformer having a low tension primary winding and a high tension secondary winding connected with the plug to provide the sparking potential for firing the plug. A source of low tension current pulses is supplied in timed relationship with the engine cycle for eventual transmission to and through the primary winding to produce sparking in timed relationship with the engine operation. The source may include a low tension magneto system or a CD ignition system.

An interlock is connected between the source and the primary winding of the ignition transformer for controlling the transmission of the current pulses from the source to the primary winding. The interlock includes a first circuit path having a first switch which may be any one of a number of safety switches operated by the clutch, transmission or other device to be placed in a safe condition before starting. The first switch is operably connected with, for example, the movable member which disengages the clutch, and the first switch is placed in a pulse-transmitting condition when the clutch is in its safe or disengaged position. The switch also has a non-transmitting condition which is assumed when the clutch is in the unsafe or engaged position.

The interlock also has second circuit path in parallel with the first circuit path and the second circuit contains a second switch, preferably an electronic switch such as an SCR having a control gate operable to change the SCR from a nonconducting or non-transmitting condition to a conducting or transmitting condition, for current pulses supplied by the source. The gate of the SCR is controlled independently of the moveable member by an actuating means responsive to the current pulses transmitted by either the first or the second circuit path. With the first switch and any others in the first circuit path closed, current pulses from the source are transmitted in the first path to the primary winding for firing the spark plug, and to the actuating means to close the second switch and maintain the transmission of further current pulses to the primary winding. When the engine is shut off, the second switch automatically returns to its non-transmitting condition to permit subsequent starting of the engine to be controlled solely by the first circuit path having the first switch monitoring safe and unsafe conditions.

BRIEF DESCRIPTION OF THE DRAWINGS

FIG. 1 shows a typical installation of the hazardous-start inhibiting interlock of the present invention.

FIG. 2 is an electrical diagram of the interlock in a low-tension magneto ignition system.

FIG. 3 is an electrical diagram of the interlock in a capacitive discharge ignition system.

FIG. 4 is a cross sectional view of a potted module containing some of the interlock components and the ignition transformer.

DESCRIPTION OF THE PREFERRED EMBODIMENTS

FIG. 1 illustrates an internal combustion engine 10 and the associated drive train including the clutch 12 and transmission 14 connecting the engine to a load 16 such as the drive axle of a tractor or an accessory device which is powered by the engine 10. FIG. 1 also illustrates generally the ignition system for the engine including a low tension pulse source 18 driven in timed relationship with the engine, a hazardous-start inhibiting interlock 20 with associated connections to the clutch 12 and load 16, an ignition transformer 22 and the spark plug 24. As illustrated, the engine 10 is a single cylinder engine and, accordingly, only a single spark plug 24 is provided for ignition. In this respect, however, the present invention also is suitable for use with multi-cylinder engines having several spark plugs fired during each engine cycle. In conjunction with the description of the interlock following, it will be readily apparent to those skilled in the art that the only modification of FIG. 1 required to accommodate a multi-cylinder engine is a pulse source 18 providing the appropriate number of current pulses during each engine cycle and a distributor between the ignition transformer and the respective spark plugs.

The interlock 20 is interposed between the low tension pulse source 18 and the ignition transformer 22 and prevents the transmission of current pulses from the source to the transformer for engine starting when an unsafe or hazardous condition exists. For example, it may be desirable that the clutch 12 be disengaged before the engine starts so that the transmission and load 16 are not placed in motion when the engine starts. Similarly, the load 16 may represent a rotatable cutter blade which should be covered by a protective shield before the engine is started. The interlock 20 is accordingly provided with two serially connected, mechanically operated safety switches 26 and 28 connected for operation with the clutch 12 and load 16 respectively to provide an indication of the unsafe condition. The clutch 12 is connected to the switch 26 by means of a mechanical control member or linkage 30 which may include, for example, the control pedal utilized by the operator of the engine, and the switch 28 is connected to the load by means of a mechanical linkage 32 that is positioned by, for example, the protective shield. The mechanical members 30 and 32 connecting the clutch 12 and load 16 with the switches 26 and 28 are indicated schematically but place the switches in an open condition whenever the unsafe condition exists and in a closed position when the safe condition exists. Therefore, continuity would exist in the interlock circuit path through the switches 26 and 28 only when it is safe to start the engine 10.

FIG. 2 illustrates in greater detail the electrical components found in the various portions of the ignition system illustrated in FIG. 1. The pulse source 18 is a low-tension magneto system including an inductive coil 34, breaker points 36 and an arc-suppressing capacitor 38, all connected in parallel. The inductive coil 34 is mounted on a stator core adjacent the flywheel of the engine, and each time a magnet mounted on the flywheel passes adjacent the core, a varying flux field is induced in the coil. At the peak variation in the flux field, the breaker points 36 open to remove the short across the coil and, as a consequence, a current pulse is transmitted to the rest of the ignition system. It will be understood that the source 18 produces one pulse for each spark plug so that each plug may be fired once during each engine cycle. The breaker points are timed to open so that the current pulse and, correspondingly, the associated spark occur near the top-dead-center position of the piston in the cylinder being fired.

The interlock 20 receives each of the current pulses from the source 18 and, for the sake of the discussion, it will be assumed that the current pulses are positive with respect to the grounded conductor illustrated in FIG. 2. To pass through the interlock to the primary coil 40 of the ignition transformer 22, the current pulses must go through either the circuit path including the serially connected and mechanically operated safety switches 26 and 28 connected with the clutch and load in FIG. 1 or through a parallel circuit path having an electronic switch illustrated as a silicon controlled rectifier (SCR) 42. If the engine has not been running for a period no less than, for example, three seconds prior to a start, the SCR 42 is nonconductive for reasons explained in greater detail below. Therefore, spark ignition and engine starting can only be had when the serially connected switches 26 and 28 are both closed indicating that a hazardous condition does not exist in either the clutch 12 or the load 16. In such case, current pulses pass through the closed switches 26 and 28 and through the primary winding 40 of the ignition transformer to induce a sparking potential in the secondary winding 44 and thereby produce a spark across the electrodes of the plug 24.

The diode 54 connected across the primary winding 40 provides a low resistance path for the ring current through the winding when each of the current pulses deteriorates.

It is relatively clear that spark ignition and continued engine operation may be carried out through the closed switches 26 and 28 until the clutch 12 is subsequently disengaged opening the switch 26 or the cutting blade in the load 16 is subsequently exposed opening the switch 28. To sustain engine operation with the switch 26 or 28 open, the SCR 42 is rendered conductive by an actuating means responsive to a continuous train of the current pulses transmitted to and through the primary winding 40. The actuating means comprises a pulse sensing circuit. The pulse sensing circuit shown includes a diode 46 and an RC timing circuit having a capacitor 48 and a voltage divider formed by resistors 50 and 52. The output of the voltage divider is connected to the control terminal or gate of the SCR 42 to change the SCR from the non-conductive to conductive state when the continuous train of pulses is detected. The anode of the SCR 42 is connected to the pulse source 18 and the cathode to the primary winding 40 so that positive current pulses can be transmitted in the circuit path through the SCR when the SCR is gated on by the RC timing circuit.

Current pulses transmitted to the primary winding through either the switches 26 and 28 or the SCR 42 charge the capacitor 48 in the timing circuit through the diode 46 and set the potential of the voltage divider output above the gate-to-cathode bias required to switch the SCR into the conductive state when the cathode drops to ground potential between current pulses. The capacitor 48 also begins to discharge between pulses; however, the time constant of the RC circuit is selected so that the capacitor 48 is not substantially discharged in less than 0.1 second but is substantially discharged in three seconds. A single cylinder engine operating at idle speed or above provides a pulse interval no more than the 0.1 second which, accordingly, is adequate to maintain a charge on the capacitor 48 and an output from the voltage divider that will hold the SCR 42 in the conductive state. Consequently, when the safety switches 26 and 28 are opened, engine operation continues by virtue of the transmission of current pulses through the circuit path formed by the SCR 42.

When the engine stalls or is shut off, a period of at least three seconds will normally elaspe without current pulses, and the capacitor 48 discharges through resistors 50 and 52 and the primary winding 40. The bias on the gate of the SCR is lost and without any latching current through the SCR, the SCR is released from its conductive state and reverts to its nonconductive state. Subsequent starting of the engine can only be executed by returning the clutch 10 and the load 16 to their safe conditions and thereby closing safety switches 26 and 28.

FIG. 3 illustrates another ignition system including the interlock 20 with the safety switches 26 and 28. In this embodiment of the system, the pulse source 18 is comprised of a capacitive discharge system having a charging coil 60, a storage capacitor 62, an SCR 64 and a trigger coil 66 connected between the cathode and gate of the SCR 64. The charging coil is mounted on a stator core adjacent the flywheel of the engine and a magnet on the flywheel cyclically induces a current in the coil 60 in synchronism with the engine cycle. With the aid of the diodes 68 and 70, positive current pulses induced in the coil are transmitted and stored on the capacitor 62.

The trigger coil 66 is also mounted on a stator core adjacent the engine flywheel at a circumferential position displaced from the stator core bearing the charging coil 60. The trigger coil 66 is so positioned that the magnet of the flywheel induces a triggering current in the coil 66 when the engine piston is in the vicinity of top-dead-center. The triggering currents gate the SCR 64 into conduction and allow the charges developed on the capacitor 62 to discharge as sharp leading-edge current pulses into the remainder of the ignition system if the interlock 20 so permits.

The interlock has the same construction as and operates in the same manner as that previously described above in connection with FIGS. 1 and 2. If proper precautions have been taken, safety switches 26 and 28 are closed and transmit current pulses to the ignition transformer 22 for starting the engine. The SCR 42 is placed in the conductive state by the transmitted current pulses to sustain engine operation until the engine again ceases to operate.

FIG. 4 illustrates in cross section a single module including most of the electrical components of the interlock 20, the ignition transformer 22 and the diode 54 described above in FIGS. 2–3. All of these components are mounted in a single housing 80 to provide an easily manufactured, structurally rigid and tamper-proof package of minimal size. The primary winding 40 and the secondary winding 44 are mounted in coaxial relationship about a ferrite core 82 anchored centrally within the bottom portion of the housing 80. All of the electrical components of the interlock 20 other than the serially connected safety switches 26 and 28 are mounted below the primary and secondary windings on a printed circuit board 84 along with the diode 54. Terminals 86 and 88 are provided to connect the module with the safety switches 26 and 28 elsewhere on the equipment or vehicle powered by the engine. Leads 90 and 92 connect the module and the windings 40 and 44 with one of the pulse sources 18 illustrated in FIGS. 2–3. A high voltage lead 94 connects the secondary winding 44 of the ignition transformer to the spark plug.

In manufacturing the module, all the components are first placed within the housing 80 as shown and then a potting compound is poured into the open top of the housing until it is filled to the upper brim. The potting compound is then allowed to set and the resulting module may be then installed as a unitary item on an engine. A potted module of this type is desirable from an operational standpoint because it is structurally sound, it is protected from the effects of dust, moisture and other environmental factors and, above all, it is tamper-proof since the electrical components of the interlock 20 cannot be reached.

In summary, the present invention has been described above in several embodiments of an ignition system having an interlock which prevents engine starting in the presence of an unsafe condition but which allows continued engine operation after the engine has been started and any one or more of the safety switches is placed in a position that indicates a hazard for starting. The invention is compatible with and has been illustrated in conjunction with several different types of ignition system pulse sources, and it can be used with either single or multiple cylinder engines. The invention has several fail-safe features that are not present in the interlock system described in the aforementioned U.S. patent. It should be noted that if either side of the safety switch is shorted to ground, the engine cannot be started. Similarly, if any of the wires between the pulse source 18, the module or the ignition transformer is broken, the engine cannot run. The safety switches handle high voltage so that they can operate in the presence of fouled contacts having a high contact resistance. In the patented system referred to above, a break in the wire between the magneto primary coil and the SCR results in loss of the safety feature and hence engine starting can be accomplished in spite of an interlock. Another advantage of the present invention is that fewer components are required in the interlock and accordingly, the interlock can be manufactured at lower cost and with less assembly effort. There are no moving parts within the interlock other than the safety switches and no modification to the engine is required since the interlock does not affect the operation of the ignition system once the engine has been started.

While the present invention has been described in several preferred embodiments, it should be understood that still further modifications and substitutions can be had without departing from the spirit of the invention. For example, although two safety switches 26 and 28 have been illustrated, it is readily apparent that only one or more than two switches can be used depending upon the number of hazards that are to be guarded against by the interlock. The magnitude of the time constant of the RC timing circuit can be varied by changing the resistive and capacitive elements. The time constant holding the SCR 42 in the conductive state when the current pulses are no more than 0.1 second apart and insuring reversion of the SCR to the nonconductive state in three seconds is intended to maintain engine operation at minimum idle speed but to prevent immediate restarting of a stalled engine in the presence of the unsafe conditions. Of course, the specific time constants of the RC circuit which produce these results will vary in single and multiple cylinder engines due to the fact that one or multiple current pulses are produced during each complete engine cycle. Accordingly, the present invention has been described in a preferred embodiment by way of illustration rather than limitation.

What is claimed is:

1. An ignition system for an internal combustion engine connected in driving relationship with at least one device having a member movable between a safe position for engine starting and an unsafe position for engine starting comprising:
   a spark plug for the internal combustion engine;
   an ignition transformer including a low tension primary and a high tension secondary winding connected with the spark plug for producing a sparking potential to fire the plug;
   a source of low tension current pulses supplied in timed relationship with the engine cycle; and
   an interlock connected between the source and the primary winding of the ignition transformer for controlling the transmission of current pulses from the source to the primary winding, the interlock comprising:
      a first circuit path between the source and the primary winding having a first switch operably connected with the movable member and placing the first circuit in a pulse-transmitting condition when the movable member is in the safe position and a non-transmitting condition when the member is in the unsafe position;
      a second circuit path parallel with the first path between the source and the primary winding and having a second switch with a control element operable to change the second switch and second circuit path between a nontransmitting condition and a transmitting condition for the pulses independently of the movable member and the first switch; and
      actuating means connected with the first and second circuit paths and with the control element of the second switch and having a pulse sensing circuit including a capacitor receiving and charged by current pulses transmitted by the first and second circuit paths to the primary winding for placing the second switch in the transmitting condition to transmit further pulses to the primary winding and including release means having a resistive means for discharging the capacitor and permitting the second switch to return to the non-transmitting condition in the absence of further current pulses.

2. An ignition system for internal combustion engines as defined in claim 1 wherein:
   the first switch in the interlock is a mechanical switch; and
   the second switch in the interlock is an electronic switch.

3. An ignition system as defined in claim 1 wherein:
   the second switch is an electronic switch in which the control element is a control terminal for setting the switch in the conductive condition; and
   the capacitor and resistive means in the pulse sensing circuit are connected with the control terminal of the second switch to control switch conduction.

4. An ignition system as defined in claim 3 wherein the second switch is a silicon controlled rectifier having the anode and cathode in the second circuit path and the gate as the control terminal connected with the capacitor and resistive means.

5. An ignition system for an internal combustion engine as defined in claim 1 wherein the ignition transformer, the second circuit path and the actuating means are mounted together in a single potted module.

6. An ignition system for an internal combustion engine as defined in claim 1 wherein the source of low tension current pulses is a low-tension magneto system.

7. An ignition system for an internal combustion engine as defined in claim 1 wherein the source of low tension current pulses is a capacitive-discharge system.

8. An ignition system for an internal combustion engine as defined in claim 1 wherein the RC circuit includes a diode connected to receive the ignition pulses; and charge the capacitor independently of the resistive means; and the electrically controlled switch is an electrnic switch having a control terminal connected with the RC circuit for charging the switch between the conductive and non-conductive conditions.

9. In combination in a system having an internal combustion engine and a member movable between a safe position for engine starting and an unsafe position, the engine operation being supported by a source supplying ignition pulses to the primary winding of an ignition transformer, the improvement comprising:
   an ignition interlock connected between the source of ignition pulses and the primary winding to selectively disconnect the source and the winding and thereby inhibit engine starting including:
      a first circuit for transmitting the ignition pulses between the source and the primary winding and having a first safety switch in the circuit operable between an open condition preventing the transmission of ignition pulses from the source to the primary winding and a closed position permitting the transmission of ignition pulses to the primary winding, the switch being connected with the movable member and placed in the open position when the member is in the unsafe position and placed in the closed position when the member is in the safe position,
      a second circuit in parallel with the first and having an electrically controlled second switch operable between a pulse-transmitting condition and a non-transmitting condition, and
      electrical control means connected in controlling relationship with the electrically controlled switch and having an RC circuit with a switch-controlling capacitor charged by the ignition pulses transmitted through the first and second circuits for holding the second switch in the pulsetransmitting condition at and above idle speed of the engine and a resistor connected to discharge the capacitor at pulse connected to discharge the capacitor at pulse rates below idle speed to release the second switch from the transmitting to the non-transmitting condition when the engine is stopped.

10. An ignition system for an internal combustion engine connected in driving relationship with at least one device having a member movable between a safe position for engine starting and an unsafe position for engine starting comprising:
   a spark plug for the internal combustion engine;

an ignition transformer including a low tension primary and a high tension secondary winding connected with the spark plug for producing a sparking potential to fire the plug;

a source of low tension current pulses supplied in timed relationship with the engine cycle; and an interlock connected between the source and the primary winding of the ignition transformer for controlling the transmission of current pulses from the source to the primary winding, the interlock including:

a first circuit path between the source and the primary winding having a first switch operably connected with the movable member and placing the first circuit in a pulse-transmitting condition when the movable member is in the safe position and a non-transmitting condition when the member is in the unsafe position;

a second circuit path parallel with the first path between the source and the primary winding and having a second switch with a control element operable to change the second switch and second circuit path between a non-transmitting condition and a transmitting condition for the pulses independently of the movable member and the first switch; and actuating means connected with the first and second circuit paths and with the control element of the second switch and responsive to current pulses transmitted by the first and second circuit paths to the primary winding for placing the second switch in the transmitting condition to transmit further pulses to the primary winding and including release means permitting the second switch to return to the non-transmitting condition in the absence of further current pulses, said release means having a time constant preventing the second switch from returning to the non-transmitting condition in less than 0.1 second after current pulses are terminated and ensuring the return to the non-transmitting condition in a period of time not greater than three seconds.

* * * * *